(12) United States Patent
Fujieda et al.

(10) Patent No.: US 11,141,791 B2
(45) Date of Patent: Oct. 12, 2021

(54) ALLOY ARTICLE, METHOD FOR MANUFACTURING SAME, AND PRODUCT USING SAME

(71) Applicant: HITACHI METALS, LTD., Tokyo (JP)

(72) Inventors: Tadashi Fujieda, Tokyo (JP); Mamoru Hirota, Tokyo (JP); Kosuke Kuwabara, Tokyo (JP); Kinya Aota, Tokyo (JP); Takahiko Kato, Tokyo (JP); Akihiko Chiba, Sendai (JP); Yuichiro Koizumi, Sendai (JP); Kenta Yamanaka, Sendai (JP); Seiichi Watanabe, Sapporo (JP)

(73) Assignee: HITACHI METALS, LTD., Tokyo (JP)

( * ) Notice: Subject to any disclaimer, the term of this patent is extended or adjusted under 35 U.S.C. 154(b) by 196 days.

(21) Appl. No.: 16/076,764

(22) PCT Filed: Oct. 25, 2016

(86) PCT No.: PCT/JP2016/081566
§ 371 (c)(1),
(2) Date: Aug. 9, 2018

(87) PCT Pub. No.: WO2017/138191
PCT Pub. Date: Aug. 17, 2017

(65) Prior Publication Data
US 2019/0047049 A1 Feb. 14, 2019

(30) Foreign Application Priority Data
Feb. 9, 2016 (JP) .............................. JP2016-022381

(51) Int. Cl.
*B22F 10/20* (2021.01)
*B22F 3/24* (2006.01)
(Continued)

(52) U.S. Cl.
CPC ................ *B22F 10/20* (2021.01); *B22F 1/00* (2013.01); *B22F 3/105* (2013.01); *B22F 3/16* (2013.01);
(Continued)

(58) Field of Classification Search
CPC .......... B22F 3/1055; B22F 1/00; B22F 3/105; B22F 3/16; B22F 3/24; B22F 9/08;
(Continued)

(56) References Cited

U.S. PATENT DOCUMENTS

2017/0209954 A1 7/2017 Kato et al.

FOREIGN PATENT DOCUMENTS

| CN | 104308153 A | 1/2015 |
| JP | 2002-173732 A | 6/2002 |
| WO | 2016/013498 A1 | 1/2016 |

OTHER PUBLICATIONS

Brif et al. ("The use of high-entropy alloys in additive manufacturing." Scripta Materialia 99 (2015): 93-96) (Year: 2015).*
(Continued)

*Primary Examiner* — Anthony J Zimmer
*Assistant Examiner* — Ricardo D Morales
(74) *Attorney, Agent, or Firm* — Volpe Koenig

(57) ABSTRACT

An object of the invention is to provide: an alloy article that has excellent homogeneity in the alloy composition and microstructure as well as significant shape controllability, using an HEA with significant mechanical strength and high corrosion resistance; a method for manufacturing the alloy article; and a product using the alloy article. There is provided an alloy article comprising: Co, Cr, Fe, Ni, and Ti elements, each element in content of 5 to 35 atomic %; more than 0 atomic % to 8 atomic % of Mo %; and remainder substances of unavoidable impurities. And, ultrafine particles with an average diameter of 40 nm or less are
(Continued)

dispersedly precipitated in matrix phase crystals of the alloy article.

18 Claims, 10 Drawing Sheets

(51) Int. Cl.
| | |
|---|---|
| C22C 30/00 | (2006.01) |
| F04D 29/02 | (2006.01) |
| B33Y 80/00 | (2015.01) |
| B33Y 10/00 | (2015.01) |
| B22F 1/00 | (2006.01) |
| B22F 3/16 | (2006.01) |
| B22F 9/08 | (2006.01) |
| B22F 3/105 | (2006.01) |
| F04D 29/28 | (2006.01) |
| C22C 19/05 | (2006.01) |
| C22C 19/07 | (2006.01) |
| B33Y 70/00 | (2020.01) |

(52) U.S. Cl.
CPC ............... *B22F 3/24* (2013.01); *B22F 9/08* (2013.01); *B22F 9/082* (2013.01); *B33Y 10/00* (2014.12); *B33Y 80/00* (2014.12); *C22C 19/056* (2013.01); *C22C 19/07* (2013.01); *C22C 30/00* (2013.01); *F04D 29/02* (2013.01); *F04D 29/28* (2013.01); *B22F 2003/248* (2013.01); *B22F 2009/0848* (2013.01); *B22F 2301/40* (2013.01); *B22F 2998/10* (2013.01); *B33Y 70/00* (2014.12); *C22C 2200/04* (2013.01)

(58) Field of Classification Search
CPC ......... B22F 9/082; B33Y 10/00; B33Y 80/00; C22C 19/056; C22C 19/07; C22C 30/00; F04D 29/02; F04D 29/28
See application file for complete search history.

(56) References Cited

OTHER PUBLICATIONS

Chou et al. ("Effect of inhibitors on the critical pitting temperature of the high-entropy alloy Co1.5CrFeNi1.5Ti0.5Mo0.1." Journal of the Electrochemical Society 158.8 (2011): C246-C251.) (Year: 2011).*

Murr et al. ("Metal fabrication by additive manufacturing using laser and electron beam melting technologies." Journal of Materials Science & Technology 28.1 (2012): 1-14.) (Year: 2012).*

Yeh et al. ("On the solidification and phase stability of a Co—Cr—Fe—Ni—Ti high-entropy alloy." Metallurgical and Materials Transactions A 45.1 (2014): 184-190.) (Year: 2014).*

Lu et al. ("A criterion for topological close-packed phase formation in high entropy alloys." Entropy 17.4 (2015): 2355-2366.) (Year: 2015).*

Extended European Search Report dated Jul. 24, 2019 for the European Patent Application No. 16889892.2.

Yeh et al., "On the Solidification and Phase Stability of a Co—Cr—Fe—Ni—Ti High-Entropy Alloy," Metallurgical and Materials Transactions A, vol. 45, Issue 1, pp. 184-190 (Jan. 2014).

Chinese Office Action dated Sep. 30, 2019 for the Chinese Patent Application No. 201680081497.1.

Chou Y.L. et al., Effect of Inhibitors on the Critical Pitting Temperature of the High-Entropy Alloy Co1.5CrFeNi1.5Ti0.5Mo0.1, Journal of the Electrochemical Society, Jun. 22, 2011, vol. 158 No. 8, C246-C251.

International Search Report dated Jan. 31, 2017 for International Application No. PCT/JP2016/081566.

* cited by examiner

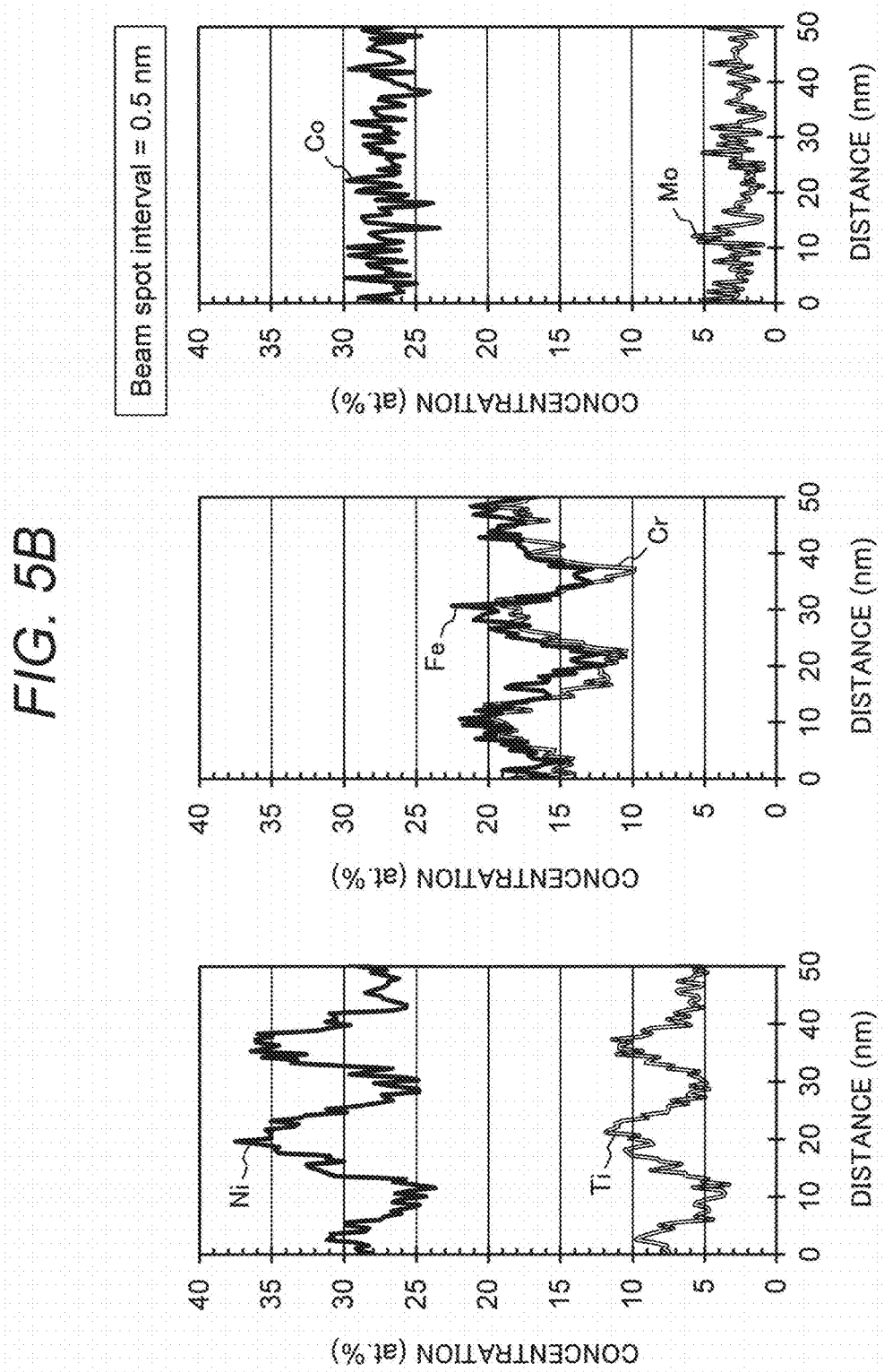

ALLOY ARTICLE, METHOD FOR MANUFACTURING SAME, AND PRODUCT USING SAME

TECHNICAL FIELD OF THE INVENTION

The present invention relates to alloy articles manufactured by a powder-based additive manufacturing method using a high entropy alloy, a method for manufacturing the alloy articles, and products using the alloy articles.

DESCRIPTION OF BACKGROUND ART

A high entropy alloy (HEA) has recently been developed as an alloy based on a new technological concept which is completely different from the concept of conventional alloys (e.g., an alloy in which a tiny amount of multiple kinds of subcomponent elements is added to one to three kinds of main component elements). The HEA is defined as an alloy configuring more than five kinds of main metallic elements, each having a content of 5 to 35 atomic percent (%), and it is known that the HEA expresses characteristics as described below.

(a) Stabilization of the mixed state resulting from the negatively-increasing mixing entropy term in the formula of Gibbs free energy; (b) diffusion delay due to complicated microstructure; (c) high degree of hardness resulting from high lattice strain due to different sizes of constituent atoms, and decrease in temperature dependency of mechanical characteristics; and (d) improved corrosion resistance as the result of combined effects of coexistence of multiple elements (also referred to as a "cocktail effect").

For example, patent literature 1 (JP 2002-173732 A) discloses a high entropy multicomponent alloy produced by casting or synthesizing multiple kinds of metallic elements, wherein the alloy contains five to eleven kinds of main metallic elements and the molar number of each kind of main metallic element is 5% to 30% of the total molar number of the alloy. Furthermore, the main metallic elements are selected from a metallic element group containing aluminum, titanium, vanadium, chromium, iron, cobalt, nickel, copper, zirconium, molybdenum, palladium, and silver.

According to the patent literature 1, it seems to be possible to provide a high entropy multicomponent alloy that is significantly harder, more heat resistant and more corrosion resistant than conventional carbon steel and alloy carbon steel, in the casting state.

CITATION LIST

Patent Literature

Patent literature 1: JP 2002-173732 A.

SUMMARY OF THE INVENTION

Problems to Be Solved By the Invention

However, the inventors of the present invention studied the high entropy alloys (HEAs) in various ways and found out that the segregation of elements and unevenness of the microstructure were prone to occur during the casting process because of the complicated alloy composition, and that it was difficult to obtain a uniform HEA ingot. The segregation of elements and unevenness of the microstructure of the alloy article would result in inconsistent characteristics depending on the regions and are therefore regarded as problems to be solved.

Furthermore, the HEAs are difficult to be conducted shaping processes thereto because of its significant hardness and resistance to become soft by tempering. Accordingly, it is difficult to form an article into a desired shape by means of mechanical processing and/or plastic deformation processing. This is a major problem to be solved before putting the HEA articles into practical and commercial use.

On the other hand, as stated above, the HEAs have attractive characteristics that cannot be obtained from conventional alloys. Therefore, there have been strongly required development of HEA articles that have excellent homogeneity in the alloy composition and microstructure as well as significant shape controllability and a method for manufacturing the HEA articles.

Thus, to satisfy the above requirements, it is an objective of the present invention to provide an alloy article that has excellent homogeneity in the alloy composition and microstructure as well as significant shape controllability, using an HEA with significant mechanical strength and high corrosion resistance, and a method for manufacturing the alloy article. Also, another objective of the invention is to provide a product using the alloy article.

Solution to Problems (I) According to one aspect of the present invention, there is provided an alloy article comprising: Co (cobalt), Cr (chromium), Fe (iron), Ni (nickel), and Ti (titanium) elements, each element in content of 5 atomic % to 35 atomic %; more than 0 atomic % to 8 atomic % of Mo (molybdenum); and remainder substances of unavoidable impurities. And, ultrafine particles with an average diameter of 40 nm or less are precipitated and dispersed in matrix phase crystals of the alloy article.

In the above alloy article (I) of the invention, the following modifications and changes can be made.

(i) The ultrafine particles may be crystalline particles in which the Ni component and the Ti component are more concentrated than in the matrix phase crystals.

(ii) Chemical composition of the alloy may contain 20 atomic % to 35 atomic % of Co, 10 atomic % to 25 atomic % of Cr, 10 atomic % to 25 atomic % of Fe, 15 atomic % to 30 atomic % of Ni, and 5 atomic % to 15 atomic % of Ti.

(iii) Chemical composition of the alloy may contain 25 atomic % to 33 atomic % of Co, 15 atomic % to 23 atomic % of Cr, 15 atomic % to 23 atomic % of Fe, 17 atomic % to 28 atomic % of Ni, 5 atomic % to 10 atomic % of Ti, and 1 atomic % to 7 atomic % of Mo.

(iv) The chemical composition of the alloy may contain 25 atomic % or more and less than 30 atomic % of Co, 15 atomic % or more and less than 20 atomic % of Cr, 15 atomic % or more and less than 20 atomic % of Fe, 23 atomic % to 28 atomic % of Ni, 7 atomic % to 10 atomic % of Ti, and 1 atomic % to 7 atomic % of Mo.

(v) The chemical composition of the alloy may contain 30 atomic % to 33 atomic % of Co, 20 atomic % to 23 atomic % of Cr, 20 atomic % to 23 atomic % of Fe, 17 atomic % or more and less than 23 atomic % of Ni, 5 atomic % or more and less than 7 atomic % of Ti, and 1 atomic % to 3 atomic % of Mo.

(vi) Tensile strength thereof may be 1050 MPa or more and breaking elongation thereof may be 10% or more.

(vii) The matrix phase crystals may be an equiaxial crystal in shape and have a simple cubic crystal structure.

(II) According to another aspect of the invention, there is provided a method for manufacturing the above alloy article, including the steps of:

mixing and melting raw materials of the alloy to form molten metal;

atomizing to form an alloy powder from the molten metal;

additive manufacturing to form an additive manufactured article with a desired shape by means of a metal powder-based additive manufacturing method using the alloy powder; and pseudo-solution heat treatment to pseudo-solutionize the additive manufactured article in a temperature range from 950° C. to 1180° C.

In the above method for manufacturing the above alloy article (II) of the invention, the following modifications and changes can be made.

(viii) The step of pseudo-solution heat treatment may be a process to water-cool or air-cool the additive manufactured article after holding the additive manufactured article within the temperature range.

(III) According to still another aspect of the invention, there is provided a product using the above alloy article. The product is an impeller of a fluid machine.

In the above product using the alloy article (III) of the invention, the following modifications and changes can be made.

(ix) The product using the alloy article may be a centrifugal compressor incorporating the impeller.

Advantages of the Invention

According to the present invention, it is possible to provide an alloy article that has excellent homogeneity in the alloy composition and microstructure as well as significant shape controllability, using an HEA with significant mechanical strength and high corrosion resistance, and a method for manufacturing the alloy article. Furthermore, it is possible to provide a product using the alloy article.

BRIEF DESCRIPTION OF THE DRAWINGS

FIG. 5B indicates line analysis results on an analysis line in FIG. 5A by an energy dispersive X-ray spectroscopic analyzer (EDX);

DETAILED DESCRIPTION OF THE PREFERRED EMBODIMENTS (Basic Concept of the Present Invention)

As stated before, although an HEA has attractive characteristics (e.g., significant hardness and resistance to become soft by tempering) that cannot be obtained from conventional alloys, it was difficult to conduct a shaping process on the HEA and form an HEA article into a desired shape, due to poor deformability of the HEA.

The inventors intensively carried out studies of alloy composition and shape control methods to develop an HEA article excellent in shape controllability and ductility without having to sacrifice the attractive characteristics of the HEA. As a result, the inventors found a possibility to obtain a new HEA article having better shape controllability and better ductility than a conventional HEA article prepared by conventional casting, by means of an additive manufacturing method using a Co—Cr—Fe—Ni—Ti—Mo alloy powder.

Specifically, it was found possible to obtain a near-net-shape HEA article which had excellent mechanical characteristics (e.g., a breaking elongation of at least 3% and a tensile strength of at least 1000 MPa). However, in terms of practical durability and long-term reliability of the HEA article and machinery using the HEA article, it is desirable that the HEA article have more significant ductility (e.g., a breaking elongation of at least 10%).

Accordingly, to develop an HEA article having desirable characteristics, the inventors further conducted detailed investigations and studies concerning the relationship among manufacturing methods, microstructure and mechanical characteristics. As a result, the inventors found that by performing predetermined heat treatment for the additive manufactured article that has been processed by a metal powder-based additive manufacturing method, it is possible to obtain microstructure in which nanoscale ultrafine particles are dispersedly and precipitated in the matrix phase crystals and both the mechanical strength and the ductility have been significantly improved. The present invention is based on this finding.

Hereinafter, preferred embodiments of the invention will be described with reference to the drawings according to the HEA article production procedures. However, the invention is not limited to specific embodiments described below, and various combinations and modifications are possible without departing from a technical concept of the invention.

[Method for Manufacturing HEA Article]

Figure 1:
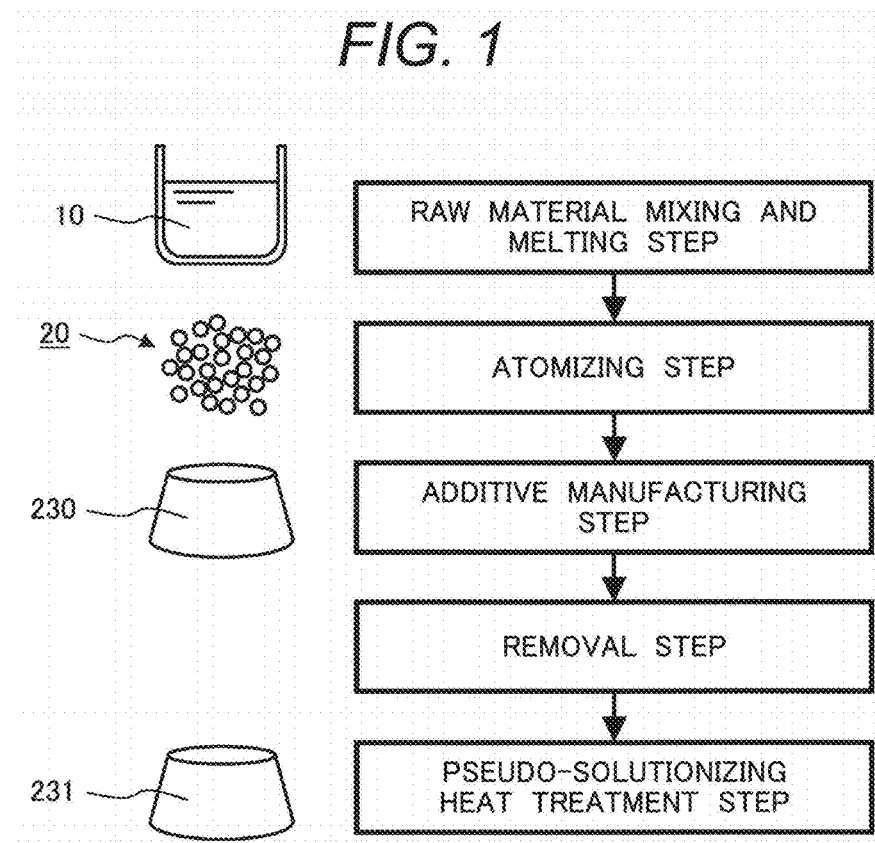
FIG. 1 is an exemplary process chart showing a method for manufacturing an alloy article according to the present invention.

FIG. 1 is an exemplary process chart showing a method for manufacturing an alloy article according to the invention. As shown in FIG. 1, the manufacturing method of the invention includes a raw material mixing and melting step, an atomizing step, an additive manufacturing step, a removal step, and a pseudo-solution heat treatment step. Hereinafter, each step of the manufacturing method will be described more specifically.

(Raw Material Mixing and Melting Step)

As shown in FIG. 1, firstly the raw material mixing and melting step is performed in which molten metal 10 is formed by mixing and melting raw materials having desired HEA composition (Co—Cr—Fe—Ni—Ti—Mo). A raw material mixing method and a melting method are not particularly limited, and any conventional method for manufacturing high mechanical strength and high corrosion-resistant alloys can be utilized. For example, vacuum melting is preferable as a melting method. It is also preferable to refine molten metal 10 by simultaneously utilizing a vacuum carbon deoxidizing technique or the like.

As main components, the HEA composition of the invention contains five elements, Co, Cr, Fe, Ni and Ti; content of each element is between 5 atomic % and 35 atomic %. As a subcomponent, it contains more than 0 atomic % to 8 atomic % of Mo. Remainder substances are unavoidable impurities.

More specifically, content of the component Co is preferably between 20 atomic % and 35 atomic %, and more preferably between 25 atomic % and 33 atomic %. Content of the component Cr is preferably between 10 atomic % and 25 atomic %, and more preferably between 15 atomic % and 22 atomic %. Content of the component Fe is preferably between 10 atomic % and 25 atomic %, and more preferably between 15 atomic % and 22 atomic %. Content of the component Ni is preferably between 15 atomic % and 30 atomic %, and more preferably between 17 atomic % and 28 atomic %. Content of the component Ti is preferably between 5 atomic % and 15 atomic %, and more preferably between 5 atomic % and 10 atomic %. Content of the component Mo is preferably more than 0 atomic % to 8 atomic %, and more preferably between 1 atomic % and 7 atomic %.

By controlling the composition of each component within the prescribed range, both the improved ductility and the improved mechanical strength can be obtained. This means that if the content of each component is beyond the preferable composition range, it is difficult to attain desirable characteristics.

Within the above composition range, when a high priority is put on the improvement of mechanical strength, content of the component Co is preferably 25 atomic % or more and less than 30 atomic %; content of the component Cr is preferably 15 atomic % or more and less than 20 atomic %; content of the component Fe is preferably 15 atomic % or more and less than 20 atomic %; content of the component Ni is preferably 23 atomic % or more and 28 atomic % or less; content of the component Ti is preferably 7 atomic % or more and 10 atomic % or less; and content of the component Mo is preferably 1 atomic % or more and 7 atomic % or less.

On the other hand, within the above composition range, when a high priority is put on the improvement of ductility, content of the component Co is preferably 30 atomic % or more and 33 atomic % or less; content of the component Cr is preferably 20 atomic % or more and 23 atomic % or less; content of the component Fe is preferably 20 atomic % or more and 23 atomic % or less; content of the component Ni is preferably 17 atomic % or more and less than 23 atomic %; content of the component Ti is preferably 5 atomic % or more and less than 7 atomic %; and content of the component Mo is preferably 1 atomic % or more and 3 atomic % or less.

(Atomizing Step)

Next, the atomizing step to form an alloy powder 20 from the molten metal 10 is performed. An atomizing method is not particularly limited, and any conventional method can be utilized. For example, a gas atomizing technique or a centrifugal atomizing technique that enables high purity, uniform composition, and formation of spherical particles can be preferably used.

For handling and filling characteristics, the average particle diameter of the alloy powder 20 is preferably between 10 μm and 1 mm, and the more preferable diameter is between 20 μm and 500 μm. If the average particle diameter is less than 10 μm, the alloy powder 20 is prone to fly up easily in the subsequent additive manufacturing step, which could result in decreasing the accuracy of the shape of an additive manufactured article. On the other hand, if the average particle diameter exceeds 1 mm, surface roughness of the resultant additive manufactured article could increase in the subsequent additive manufacturing process or the alloy powder 20 could melt insufficiently.

(Additive Manufacturing Step)

Next, the additive manufacturing step is performed to form an additive manufactured article 230 with a desired shape by a metal powder-based additive manufacturing method using the alloy powder 20 prepared as mentioned above. By applying a metal powder-based additive manufacturing method by which near-net-shape metal articles are formed by melting and solidification instead of sintering, it is possible to form a three-dimensional metal article having a complicated shape as hard as or harder than a metal cast article. An additive manufacturing method is not particularly limited, and any conventional method is usable. For example, an electron beam melting (EBM) technique and a selective laser melting (SLM) technique can be preferably utilized for the metal powder-based additive manufacturing method.

Figure 2:
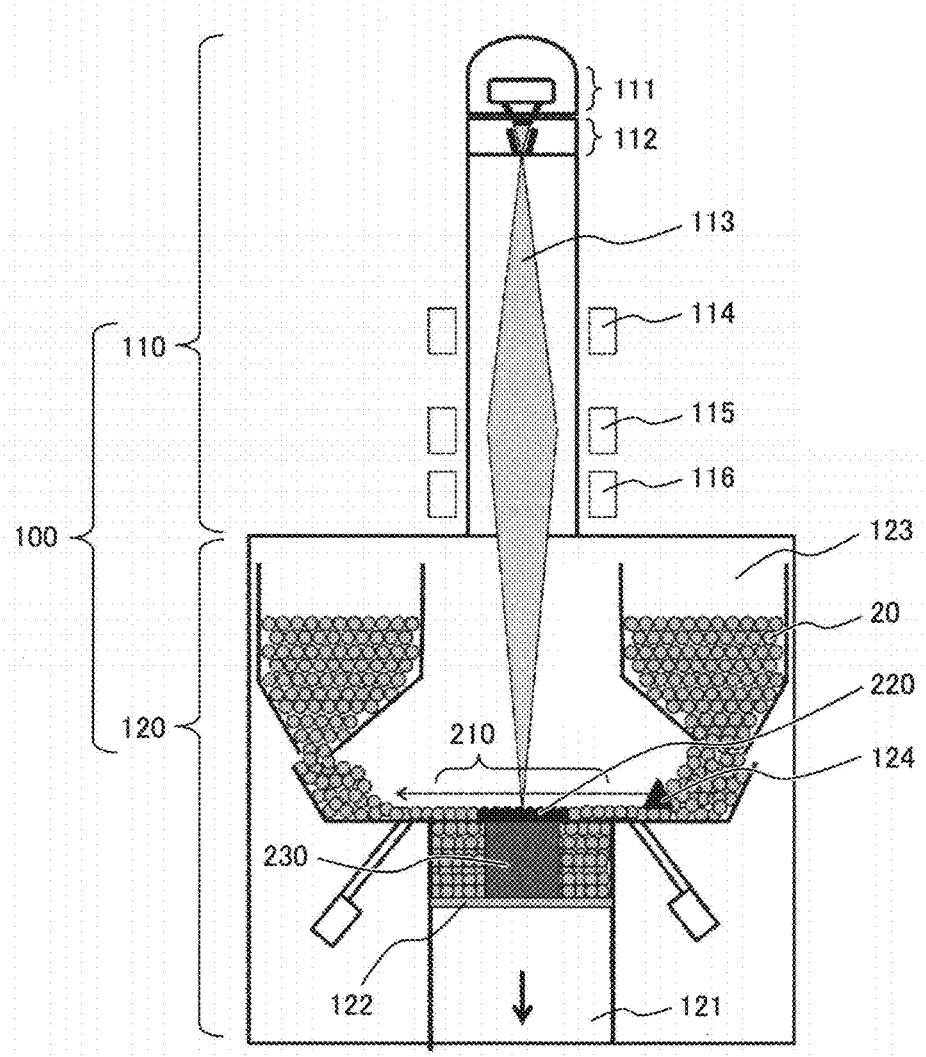
FIG. 2 is an exemplary schematic illustration showing cross-sectional view of a configuration of an EBM powder-based additive manufacturing apparatus and an additive manufacturing method.

The additive manufacturing step will be described using the EBM technique as an example. FIG. 2 is an exemplary schematic illustration showing cross-sectional view of a configuration of an EBM powder-based additive manufacturing apparatus and an additive manufacturing method. As shown in the drawing, the EBM powder-based additive manufacturing apparatus 100 configures a vacuum chamber having an electron beam control part 110 and a powder control part 120.

An exemplary procedure of the EBM powder-based additive manufacturing method is as follows. 1) A stage 121 is descended by the thickness of one layer (e.g., approximately 30 to 800 μm) of the additive manufactured article 230 to be formed. The alloy powder 20 is supplied from a powder hopper 123 on a base plate 122 located on the upper surface of the stage 121, the alloy powder 20 is then planarized by a rake arm 124 to form a powder bed 210 (layered powder) (powder bed forming substep).

2) Thermal electrons are radiated from a tungsten filament 111 heated (e.g., to 2500° C. or higher) and accelerated by an anode 112 (e.g., to nearly half the speed of light) to form an electron beam 113. The accelerated electron beam 113 is shaped into an exact circle by an astigmatic correction apparatus 114 and converges on the powder bed 210 by a focus coil 115.

3) The powder bed 210 overall is preliminary heated by scanning relatively weak (blunt) focused beam using a deflection coil 116 to form a calcined object of the powder bed. In the EBM technique, it is preferable that the substep (powder bed calcination substep) to form a calcined object of the powder bed be performed before the powder bed is locally melted and solidified. This is conducted to prevent the powder bed from flying up due to the electrification of the alloy powder resulting from the radiation of a focused electron beam that is intended to locally melt the powder bed. Also, heating in this substep is additionally effective because residual stress imposed on the additive manufactured article can be released and deformation of the additive manufactured article 230 can be suppressed.

The calcination temperature for calcining the powder bed 210 is preferably between 900° C. and 1000° C. When the calcination temperature drops below 900° C., sintering of the alloy powder does not progress much, making it difficult to form a calcined object. On the other hand, when the calcination temperature rises above 1000° C., sintering of the alloy powder progresses too quickly, making it difficult to remove the additive manufactured article 230 (i.e. difficult separation of the additive manufactured article 230 from the calcined object).

4) Next, a local melting and solidified layer forming substep is performed. That is, a minute alloy molten pool is first formed by radiating a strong focused electron beam for the local melting onto the calcined object of the powder bed, based on 2D (two-dimensional) slice data converted from 3D CAD (three-dimensional computer-aided design) data of the additive manufactured article 230 to be shaped. The minute alloy molten pool is then moved and sequentially solidified by means of scanning of the focused electron beam. Thus, 2D slice solidified layer 220 is formed.

5) The above procedure from 1) to 4) is repeated to form an additive manufactured article 230 having a desired shape.

(Removal Step)

The additive manufactured article 230 formed through the above steps is buried in the calcined object. Therefore, a step to get out the additive manufactured article 230 from the calcined object is then performed. A method to get out the additive manufactured article 230 (i.e., a method of separating the additive manufactured article 230 from the calcined object, and a method of separating the additive manufactured article 230 from the base plate 122) is not particularly limited, and any conventional method can be utilized. For example, a sandblasting technique using the alloy powder 20 is preferable. The sandblasting technique using the alloy powder 20 enables the removed calcined object to be ground together with the blasted alloy powder 20, and the obtained alloy powder can be reused as an alloy powder 20.

After the removal step, a specimen was sampled from the additive manufactured article 230 and a microstructure of the specimen was observed by means of an optical microscope and an electron microscope. As a result, it is revealed that a matrix phase of the additive manufactured article 230 has a structure (so-called, quench-solidified structure) in that minute columnar crystals (average particle diameter of 100 μm or less) stand together in large numbers along the lamination direction of the additive manufactured article 230. In addition, further observation has revealed that acicular crystals of an intermetallic compound phase are dispersedly precipitated in a grid-like pattern in the matrix phase crystals of the additive manufactured article 230.

(Pseudo-Solutionizing Heat Treatment Step)

Next, the pseudo-solutionizing heat treatment is performed to almost completely solutionize (referred to as "pseudo-solutionize" in the present invention) the intermetallic compound phase of acicular crystals of the aforementioned additive manufactured article 230. The temperature of the heat treatment is preferably within a range from 950° C. to 1180° C., more preferably from 1000° C. to 1150° C., and further preferably from 1050° C. to 1120° C. The heating atmosphere is not particularly limited, and the atmospheric air or non-oxidizing atmosphere (atmosphere in which substantially almost no oxygen is present; e.g., in vacuum or in high-purity argon) may be used.

Furthermore, after the additive manufactured article 230 has been held within the temperature range for an appropriate duration of time, it is preferable that the additive manufactured article be quickly cooled (e.g., by air-cooling or water-cooling). Specifically, by quickly cooling (e.g., cooling at a rate of at least 10° C./s) the additive manufactured article to allow it to quickly pass specific temperature range (e.g., from 900° C. to 800° C.) in which the intermetallic compound phase tends to be re-precipitated and its particles easily grow, it is possible to obtain a pseudo-solutionized additive manufactured article 231 having a microstructure in which nanoscale ultrafine particles are dispersedly precipitated in the matrix phase crystals.

The average diameter of the ultrafine particles dispersedly precipitated is preferably 40 nm or less, more preferably 1 nm or more and 30 nm or less, and further preferably 2 nm or more and 20 nm or less. If the average diameter of the ultrafine particles becomes larger than 40 nm, mechanical characteristics rapidly deteriorate (details will be described later).

[HEA Article]

Figure 3A:
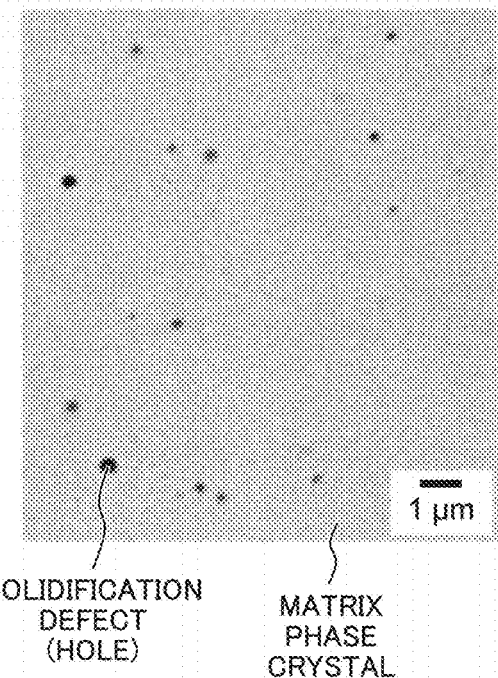
FIG. 3A is an SEM image showing an exemplary microstructure of a pseudo-solutionized additive manufactured article according to the present invention.
Figure 3B:
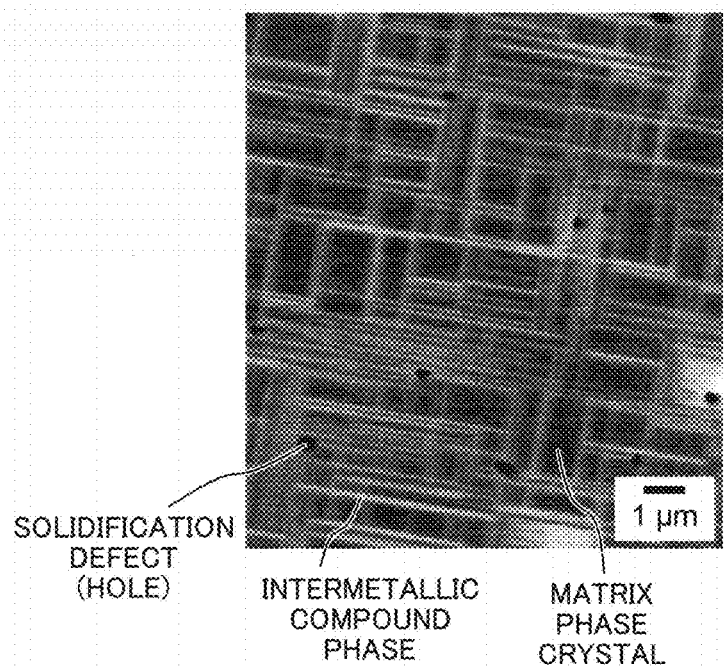
FIG. 3B is another SEM image showing an exemplary microstructure of an additive manufactured article which has not been treated with the pseudo-solutionizing heat treatment.

A specimen for the microstructure observation was sampled from the obtained pseudo-solutionized additive manufactured article 231 and the microstructure of the specimen was observed using a scanning electron microscope (SEM). FIG. 3A is an SEM image showing an exemplary microstructure of the pseudo-solutionized additive manufactured article according to the invention. FIG. 3B is another SEM image showing an exemplary microstructure of the additive manufactured article which has not been treated with the pseudo-solutionizing heat treatment. Herein, black spots observed in FIGS. 3A and 3B are defects (solidification defects, e.g., holes) caused during the additive manufacturing process.

As stated before, in the additive manufactured article 230 shown in FIG. 3B, it is confirmed that the acicular crystals of the intermetallic compound phase are dispersedly precipitated in a three-dimensional grid-like pattern in the matrix phase crystals. In contrast, as shown in FIG. 3A, it is observed that acicular crystals seemed to have completely disappeared from the pseudo-solutionized additive manufactured article 231 at the resolution of this SEM observation.

Next, to investigate the microstructure of the pseudo-solutionized additive manufactured article 231 in more detail, the microstructure was observed using a transmission electron microscope (TEM) and a scanning transmission electron microscope—energy dispersive X-ray spectroscopic analyzer (STEM-EDX).

Figure 4:
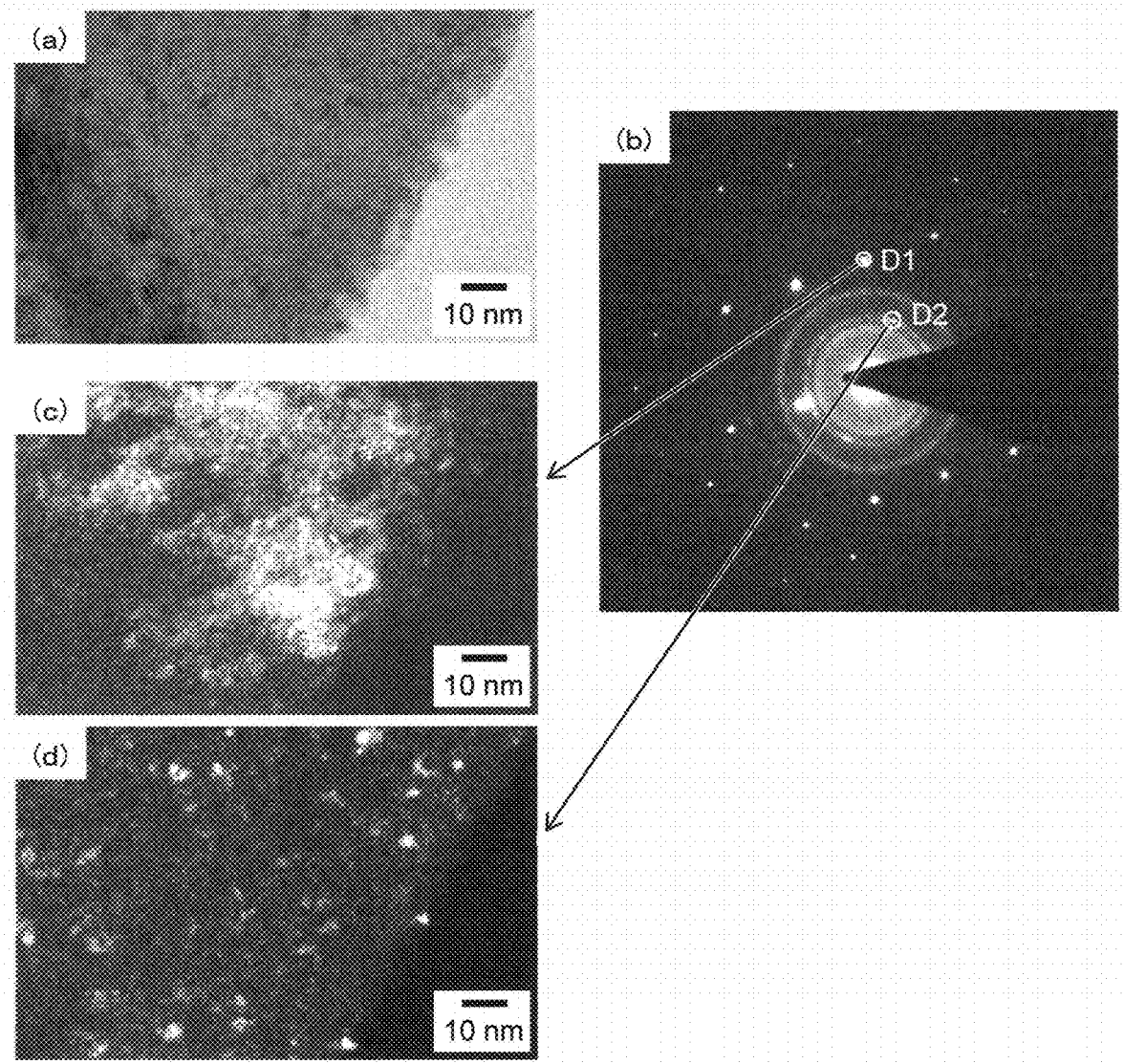
FIG. 4 is TEM observation images showing an exemplary microstructure of the pseudo-solutionized additive manufactured article, (a) being a bright-field image, (b) being an electron diffraction pattern obtained from the viewing field of (a), (c) being a dark-field image obtained from a diffraction spot D1 in (b), and (d) being a dark-field image obtained from a diffraction ring D2 in (b)

FIGS. 4(a) to 4(d) are TEM observation images showing an exemplary microstructure of the pseudo-solutionized additive manufactured article. FIG. 4(a) is a bright-field image; FIG. 4(b) is an electron diffraction pattern obtained from the viewing field of FIG. 4(a); FIG. 4(c) is a dark-field image obtained from a diffraction spot D1 in FIG. 4(b); and FIG. 4(d) is a dark-field image obtained from a diffraction ring D2 in FIG. 4(b). As shown in FIG. 4(b), the electron diffraction pattern obtained from the viewing field in FIG. 4(a) is characteristic in having both diffraction spots, such as D1, and concentrical diffraction rings (Debye-Scherrer ring), such as D2, centered at the diffraction spot of the transmitted beam.

As shown in FIG. 4(c), the matrix phase is seen as a bright portion in the dark-field image taken from the diffraction spot D1; therefore, the diffraction spot is deemed to reflect a relatively large matrix phase crystal particle. Also, as shown in FIG. 4(d), in the dark-field image taken from the Debye-Scherrer ring D2, it is observed that bright portions with a 1 to 10 nm diameter are dispersed. The Debye-Scherrer ring means the aggregation of diffraction spots originated from ultrafine crystal particles (i.e., the presence of a large number of ultrafine crystal particles having random crystal orientation). That is, based on the observation results, it is deemed that the relatively large matrix phase crystal particle in the pseudo-solutionized additive manufactured article 231 comprises a large number of ultrafine crystal particles.

Figure 5A:
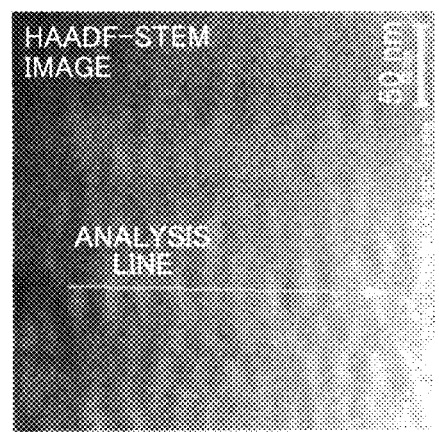
FIG. 5A is a high-angle scattering circular dark-field image observed by a scanning transmission electron microscope (HAADF-STEM image) showing an exemplary microstructure of the pseudo-solutionized additive manufactured article according to the present invention.

FIG. 5A is a high-angle scattering circular dark-field image observed by a scanning transmission electron microscope (HAADF-STEM image) showing an exemplary microstructure of the pseudo-solutionized additive manufactured article according to the invention; and FIG. 5B indicates line analysis results on an analysis line in FIG. 5A by an energy dispersive X-ray spectroscopic analyzer. As shown in FIG. 5A, cyclic brightness and darkness (bright portion/dark portion) can be seen in the HAADF-STEM image. In principle, elements with large atomic weight constitute a bright portion in the HAADF-STEM image. It is therefore suggested that the pseudo-solutionized additive manufactured article 231 according to the invention has a microscopically composition-modulated structure.

Furthermore, as shown in FIG. 5B, based on the EDX line analysis results, composition modulations of Ni, Ti, Cr and Fe are observed. More specifically, an N—Ti-concentrated region (8 nm wide on average) is formed, and concentrations of Cr and Fe are low in that region (i.e., Cr—Fe-diluted region). As for Co and Mo, apparent composition modulation is not observed. These observation results suggest a possibility in that crystals of Ni—Ti—Co system alloy (Ni—Ti—Co alloy, Ni—Ti—Co—Mo alloy, or intermetallic compound of Ni—Ti—Co or Ni—Ti—Co—Mo) are formed in the Ni—Ti-concentrated region.

[Products Using HEA Article]

Figure 6:
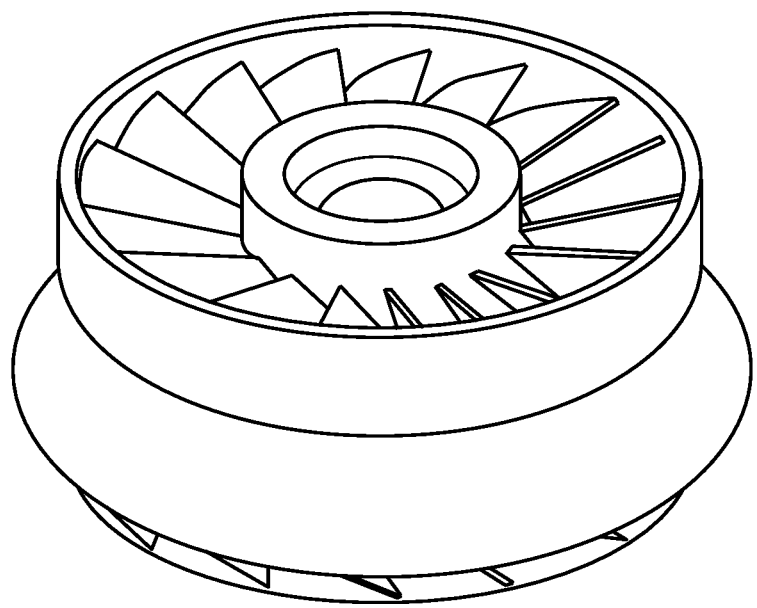
FIG. 6 is a photograph of an impeller of a fluid machine showing an exemplary product using an HEA article according to the present invention.

FIG. 6 is a photograph of an impeller of a fluid machine showing an exemplary product using the HEA article according to the invention. Since an HEA product according to the invention is manufactured by a metal powder-based additive manufacturing method, it is possible to easily form an object that has a complicated shape as shown in FIG. 6. Furthermore, the impeller using the HEA article of the invention has both excellent mechanical characteristics and high corrosion resistance; therefore, it is significantly durable even in environments exposed to severe stress and corrosion.

Figure 7:
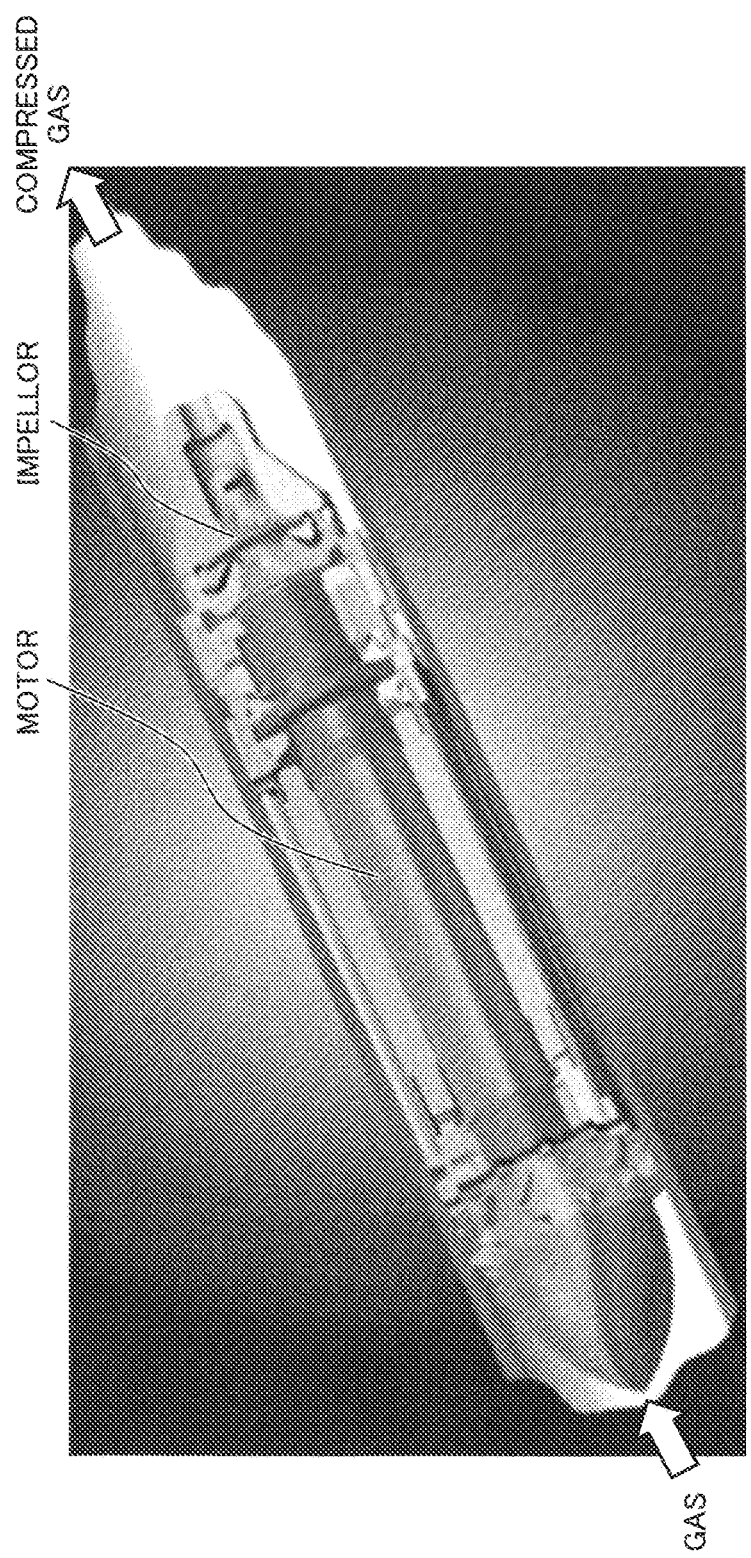
FIG. 7 is a schematic illustration showing a cross-sectional view of a centrifugal compressor into which the impeller according to the invention is incorporated.

FIG. 7 is a schematic illustration showing a cross-sectional view of a centrifugal compressor into which the impeller according to the invention is incorporated. This is another example of a product made of the HEA article according to the invention. The use of the impeller, which is significantly durable even in environments exposed to severe stress and corrosion, will contribute to the improved long-term reliability of the centrifugal compressor.

EXAMPLES

Hereinafter, the invention will be described more specifically by showing examples and comparative examples. However, the invention is not limited to those examples.

[Experimental 1]
(Preparation of HEA Powders P1 to P6)

First, the raw material mixing and melting step was conducted, in which raw materials were mixed so as to have nominal composition shown in Table 1 and melted by the vacuum melting technique to form a molten metal. Then, the atomizing step was conducted using the gas atomizing technique to form an alloy powder from the molten metal. Subsequently, the obtained alloy powder was sieved into a particle diameter range from 45 μm to 105 μm. Thus, HEA powders P1 to P6 were prepared. Then, the particle size distributions of the HEA powders P1 to P6 were measured by means of a laser diffraction particle size distribution measuring apparatus. The result indicates that the average particle diameter of each powder was approximately 70 μm.

TABLE 1

Nominal composition of HEA powders P1 to P6 (unit: atomic %).

| HEA powder | Co | Cr | Fe | Ni | Ti | Mo |
|---|---|---|---|---|---|---|
| P1 | 26.8 | 17.9 | 17.9 | 26.8 | 8.9 | 1.8 |
| P2 | 26.3 | 17.5 | 17.5 | 26.3 | 8.8 | 3.5 |
| P3 | 25.4 | 17.0 | 17.0 | 25.4 | 8.5 | 6.8 |
| P4 | 25.0 | 16.7 | 16.7 | 25.0 | 8.3 | 8.3 |
| P5 | 28.9 | 19.2 | 19.2 | 23.1 | 7.7 | 1.9 |
| P6 | 31.3 | 20.8 | 20.8 | 18.8 | 6.3 | 2.1 |

[Experimental 2]
(Production of Pseudo-Solutionized Additive Manufactured HEA Articles M1E-SW and M1E-SA)

Using the HEA powder P1 prepared in experimental 1, an additive manufactured HEA article was formed by the EBM technique according to the additive manufacturing processes with the powder-based additive manufacturing apparatus (made by Arcam AB, model: A2X) as shown in FIG. 2. The additive manufactured HEA article was a columnar object with a diameter of 14 mm and a height of 85 mm, and the height direction is the lamination direction. The calcination temperature for the powder bed was set to 950° C.

After the additive manufacturing step, the removal step was conducted in which the calcined object around the additive manufactured HEA article was removed by the sandblasting technique using the HEA powder P1. Thus, the additive manufactured HEA article M1E was obtained.

After the removal step, the pseudo-solutionizing heat treatment step was performed for the additive manufactured HEA article M1E, wherein the additive manufactured HEA article was held in the atmospheric air for three hours in the temperature range from 950° C. to 1180° C. and then quickly cooled, so as to produce a pseudo-solutionized additive manufactured HEA article M1E-S. In this process, a specimen cooled by water (at an average cooling rate of approximately 100° C./s at a temperature from 900° C. to 800° C.) using water-cooling as a rapid cooling method is referred to as "pseudo-solutionized additive manufactured HEA article M1E-SW"; and another specimen cooled by air (at an average cooling rate of approximately 10° C./s at a temperature from 900° C. to 800° C.) using air-cooling as a rapid cooling method is referred to as "pseudo-solutionized additive manufactured HEA article M1E-SA."

(Production of Pseudo-Solutionized Additive Manufactured HEA Articles M2E-SW, M2E-SA to M6E-SW, and M6E-SA)

In the same manner as the above, the additive manufacturing step, removal step, and pseudo-solutionizing heat treatment step were performed for the HEA powders P2 to P6 so as to produce pseudo-solutionized additive manufactured HEA articles M2E-SW, M2E-SA to M6E-SW, and M6E-SA.

[Experimental 3]

(Production of Additive Manufactured HEA Articles M1E to M4E)

In the same manner as the above, the additive manufacturing step and the removal step were performed for the HEA powders P1 to P4 prepared in experimental 1 so as to produce additive manufactured HEA articles M1E to M4E. Those additive manufactured HEA articles are specimens for which the pseudo-solutionizing heat treatment step was not performed, and they are reference specimens used to assess the effect of the pseudo-solutionizing heat treatment.

(Production of General Cast HEA Articles M1C to M4C)

By means of an arc melting technique using a water-cooled copper mold, the HEA powders P1 to P4 prepared in experimental 1 were cast into general cast articles each of which was a prismatic object with a width of 14 mm, a length of 80 mm and a height of 15 mm. Herein, in order to suppress the segregation of constituent elements and unevenness of the microstructure as much as possible during the casting process, melting was repeatedly conducted more than five times. Thereby, general cast HEA articles M1C to M4C were obtained. These general cast HEA articles are specimens for which the additive manufacturing step was not performed, and they are reference specimens used to assess the effect of the additive manufacturing process.

(Production of Pseudo-Solutionized Additive Manufactured HEA Article M1E-SW-A)

In order to grow/coarsen the ultrafine particles dispersedly precipitated in the matrix phase crystals, an aging heat treatment was additionally performed for the pseudo-solutionized additive manufactured HEA article M1E-SW prepared in experimental 2. Specifically, the article M1E-SW was held in the atmospheric air for an hour at 900° C. and then air-cooled. Thus, another pseudo-solutionized additive manufactured HEA article M1E-SW-A was obtained. This is used as a comparative example.

[Experimental 4]

(Observation of Microstructure of HEA Articles)

A test specimen for the observation of microstructure was sampled from each HEA article and the microstructure of the specimen was observed using an optical microscope, various electron microscopes (SEM, TEM, STEM-EDX) and an X-ray diffraction (XRD) apparatus. Table 2 shows the production specifications of each HEA article and the microstructure observation results.

TABLE 2

Production specifications of each HEA article and microstructure observation results.

| HEA article | HEA powder | Pseudo-solutionizing heat treatment (Rapid cooling method) | Matrix phase structures Crystal shape (Crystal structure) | Average crystal diameter | Precipitates Main precipitation phase (Shape) | Precipitation form |
|---|---|---|---|---|---|---|
| M1C | P1 | Not provided | Equiaxial crystal (SC + FCC) | Approx. 900 μm | $Ni_3Ti$ (Acicular crystals) | Random aggregation |
| M1E | | | Columnar crystal (SC) | ≤100 μm | | Three-dimensional grid-like pattern |
| M1E-SW | | Provided (Water-cooling) | Equiaxial crystal (SC) | Approx. 300 μm | Ni—Ti—Co alloy (Ultrafine particles) | Dispersion |
| M1E-SA | | Provided (Air-cooling) | | Approx. 500 μm | | |
| M1E-SW-A | | Provided (Water-cooling) | | Approx. 400 μm | | |
| M2C | P2 | Not provided | Equiaxial crystal (SC + FCC) | Approx. 900 μm | $Ni_3Ti$ (Acicular crystals) | Random aggregation |
| M2E | | | Columnar crystal (SC) | ≤100 μm | | Three-dimensional grid-like pattern |
| M2E-SW | | Provided (Water-cooling) | Equiaxial crystal (SC) | Approx. 300 μm | Ni—Ti—Co alloy (Ultrafine particles) | Dispersion |
| M2E-SA | | Provided (Air-cooling) | | Approx. 500 μm | | |
| M3C | P3 | Not provided | Equiaxial crystal (SC + FCC) | Approx. 900 μm | $Ni_3Ti$ (Acicular crystals) | Random aggregation |
| M3E | | | Columnar crystal (SC) | ≤100 μm | | Three-dimensional grid-like pattern |
| M3E-SW | | Provided (Water-cooling) | Equiaxial crystal (SC) | Approx. 300 μm | Ni—Ti—Co alloy (Ultrafine particles) | Dispersion |
| M3E-SA | | Provided (Air-cooling) | | Approx. 500 μm | | |
| M4C | P4 | Not provided | Equiaxial crystal (SC + FCC) | Approx. 900 μm | $Ni_3Ti$ (Acicular crystals) | Random aggregation |
| M4E | | | Columnar crystal (SC) | ≤100 μm | | Three-dimensional grid-like pattern |
| M4E-SW | | Provided (Water-cooling) | Equiaxial crystal (SC) | Approx. 300 μm | Ni—Ti—Co alloy (Ultrafine particles) | Dispersion |
| M4E-SA | | Provided (Air-cooling) | | Approx. 500 μm | | |

TABLE 2-continued

Production specifications of each HEA article and microstructure observation results.

| HEA article | HEA powder | Pseudo-solutionizing heat treatment (Rapid cooling method) | Matrix phase structures | | Precipitates | |
|---|---|---|---|---|---|---|
| | | | Crystal shape (Crystal structure) | Average crystal diameter | Main precipitation phase (Shape) | Precipitation form |
| M5E-SW | P5 | Provided (Water-cooling) | Equiaxial crystal (SC) | Approx. 300 μm | Ni—Ti—Co alloy (Ultrafine particles) | Dispersion |
| M5E-SA | | Provided (Air-cooling) | | Approx. 500 μm | | |
| M6E-SW | P6 | Provided (Water-cooling) | Equiaxial crystal (SC) | Approx. 300 μm | Ni—Ti—Co alloy (Ultrafine particle) | Dispersion |
| M6E-SA | | Provided (Air-cooling) | | Approx. 500 μm | | |

As shown in Table 2, as for the matrix phase structure, the general cast HEA articles M1C to M4C have a structure comprising equiaxial crystals whose average crystal diameter is approximately 900 μm. More specifically, the structure is a typical cast solidified microstructure in which the diameter of crystals located near the mold is relatively small and it becomes larger as the crystals are located closer to the central portion of the mold. The XRD measurement results indicate that the equiaxial crystal structure is a mixture of simple cubic (SC) crystals and face-centered cubic (FCC) crystals. In other words, the FCC crystals are apparently included.

The matrix phase structure of the additive manufactured HEA articles M1E to M4E has a structure wherein fine columnar crystals (average crystal diameter of 100 μm or less) stand together in large numbers along the lamination direction of the additive manufactured article (so-called rapidly-cooled and solidified structure). Based on the XRD measurement results, the columnar crystal structure is deemed to consist of simple cubic (SC) crystals.

The matrix phase structure of the pseudo-solutionized additive manufactured HEA articles comprise equiaxial crystals; however, the average crystal diameters are slightly different depending on the rapid cooling methods used for the pseudo-solutionizing heat treatment step and whether the aging heat treatment was provided or not. Specifically, as for the water-cooled specimens (M1E-SW to M6E-SW) using water-cooling as a rapid cooling method, the average crystal diameter of the matrix phase crystals is approximately 300 μm. As for the air-cooled specimens (M1E-SA to M6E-SA) using air-cooling as a rapid cooling method, the average crystal diameter of the matrix phase crystals is approximately 500 μm. As for the specimen (M1E-SW-A) for which the aging heat treatment was performed after the pseudo-solutionizing heat treatment step, the average crystal diameter of the matrix phase crystals is approximately 400 μm. Based on the XRD measurement results, each of those equiaxial crystal structures is deemed to consist of simple cubic (SC) crystals.

Figure 8:
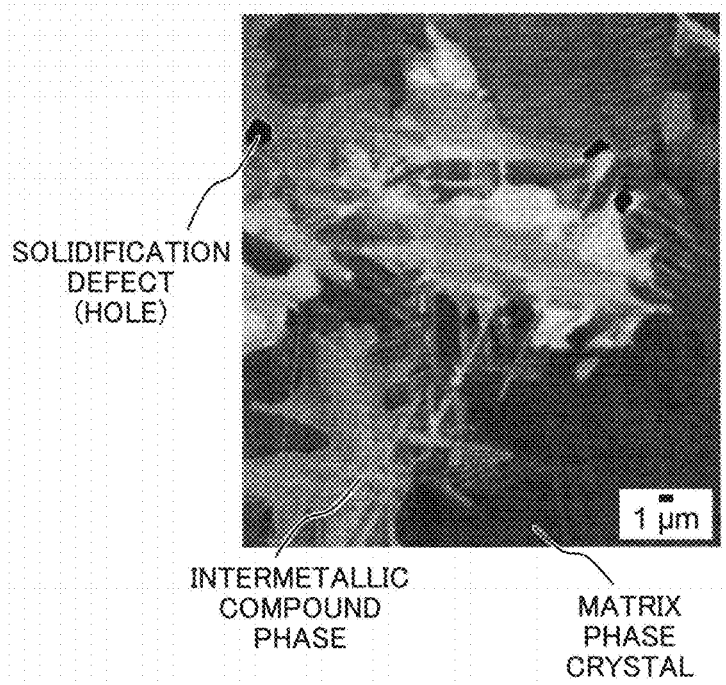
FIG. 8 is an SEM image showing an exemplary microstructure of specimen M1C of a general cast HEA article.

On the other hand, precipitates are significantly different depending on the methods of producing HEA articles. FIG. 8 is an SEM image showing an exemplary microstructure of the general cast HEA article M1C. FIG. 3B, shown earlier, is an SEM image showing an exemplary microstructure of the additive manufactured HEA article M1E; and FIG. 3A is an SEM image showing an exemplary microstructure of the pseudo-solutionized additive manufactured HEA article M1E-SW. Also in other HEA articles, a characteristic precipitate structure has been observed which is specific to each of the general cast HEA articles, additive manufactured HEA articles, and pseudo-solutionized additive manufactured HEA articles.

As shown in FIG. 8, it is observed that acicular crystals randomly aggregate in the general cast HEA article M1C. Since the XRD measurement detected the $Ni_3Ti$ phase, it is considered that the acicular crystal of the main precipitate is the $Ni_3Ti$ phase. However, the XRD measurement results do not completely deny the precipitation of NiTi phase and/or $NiTi_2$ phase. In other words, there is a possibility that slight precipitation of the NiTi phase and/or the $NiTi_2$ phase is occurring.

As mentioned before, in the additive manufactured HEA article M1E shown in FIG. 3B, the acicular crystals in the main precipitation phase are dispersedly precipitated in a three-dimensional grid-like pattern. The XRD measurement also detected the $Ni_3Ti$ phase.

Furthermore, in the HEA articles M4C and M4E produced using HEA powder P4 containing more than 8 atomic % of Mo, the XRD measurement detected a diffraction peak that is deemed to be a σ phase (i.e., embrittlement phase) in addition to the $Ni_3Ti$ phase being the main precipitation phase.

In contrast with the general cast HEA articles and the additive manufactured HEA articles, in the pseudo-solutionized additive manufactured HEA article M1E-SW shown in FIG. 3A, microstructure observation by the SEM indicates that acicular crystals seem to have completely disappeared, as stated earlier. The XRD measurement did not detect a diffraction peak other than the matrix phase crystals.

On the other hand, as for the pseudo-solutionized additive manufactured HEA articles, microstructure observations by the TEM and the STEM-EDX have verified that extremely small Ni—Ti-concentrated regions (Cr—Fe-diluted regions) are dispersedly precipitated in the matrix phase crystals. Furthermore, it is suggested that component Co may also be present in the Ni—Ti-concentrated regions, and Ni—Ti—Co alloy crystals may be formed (see FIG. 5B).

The average diameter of the dispersedly precipitated ultrafine particles (Ni—Ti-concentrated regions) slightly varies depending on the rapid cooling methods used in the pseudo-solutionizing heat treatment step. Specifically, as for the water-cooled specimens (M1E-SW to M6E-SW) using water-cooling as a rapid cooling method, the average diameter of the ultrafine particles was approximately 2 to 20 nm. On the other hand, as for the air-cooled specimens (M1E-SA to M6E-SA) using air-cooling as a rapid cooling method, the average diameter of the ultrafine particles was approximately 10 to 40 nm.

Figure 9:
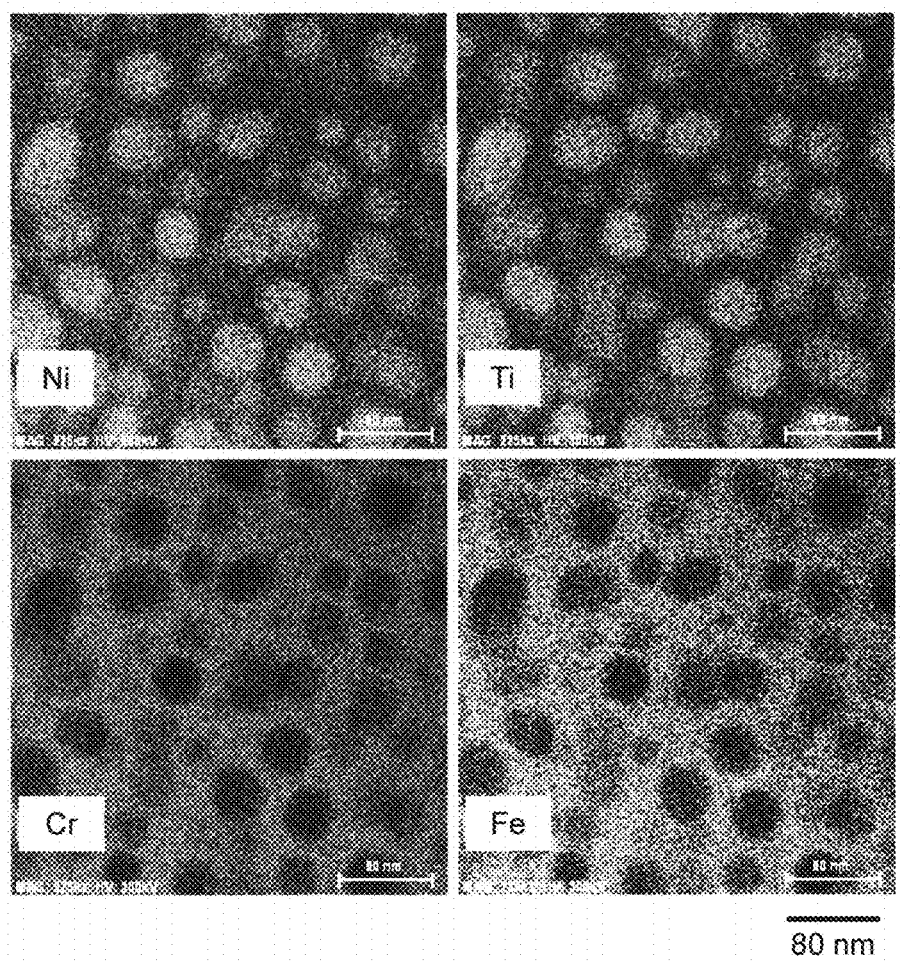
FIG. 9 shows area analysis results obtained by the EDX showing an exemplary microstructure of specimen M1E-SW-A of a pseudo-solutionized additive manufactured HEA article.

FIG. 9 shows area analysis results obtained by the EDX showing an exemplary microstructure of the pseudo-solutionized additive manufactured HEA article M1E-SW-A. As stated above, the pseudo-solutionized additive manufactured HEA article M1E-SW-A is a specimen additionally treated with the aging heat treatment after the pseudo-solutionizing heat treatment step so as to grow/coarsen the ultrafine particles. As shown in FIG. 9, the granular-shaped Ni—Ti-concentrated regions (Cr—Fe-diluted regions) are observed. The average diameter of the regions is more than 40 nm.

[Experimental 5]

(Measurement of Mechanical Characteristics and Corrosion Resistance of HEA Articles)

Test specimens (parallel portion diameter of 4 mm, parallel portion length of 20 mm) were sampled for a tensile test from each of the HEA articles produced as stated above. The test specimens of the additive manufactured HEA articles and the pseudo-solutionized additive manufactured HEA articles were taken so that the longitudinal direction of the test specimen matches the additive manufacturing direction.

Using a material universal testing machine, the room-temperature tensile test was conducted for each test specimen in accordance with JIS Z 2241 at a rate of strain of $5\times10^{-5}$ s$^{-1}$, and the tensile strength and the breaking elongation were measured. From 10 measurements of the tensile test, the maximum value and the minimum value were excluded, and the average value of the remaining 8 measurements was obtained. To evaluate the tensile strength, the value of 1050 MPa or more is judged to be "Passed" and the value of less than 1050 MPa is judged to be "Failed". To evaluate the breaking elongation, the value of 10% or more is judged to be "Passed" and the value of less than 10% is judged to be "Failed". The results are shown in Table 3.

Furthermore, from each HEA article prepared above, a polarization test specimen (length of 15 mm, width of 15 mm, and thickness of 2 mm) was sampled for a pitting corrosion test. The pitting corrosion test was conducted for each polarization test specimen in accordance with JIS G 0577. Specifically, under the conditions of "Test area: 1 cm$^2$, clearance corrosion prevention electrodes attached to the polarization test specimen, reference electrode: saturated silver/silver chloride electrode, test solution: 3.5% sodium chloride solution deaerated by argon gas, test temperature: 80° C., potential sweep rate: 20 mV/min," the anode polarization curve of the polarization test specimen was measured and the pitting potential corresponding to the current density of 100 μA/cm$^2$ was obtained. To evaluate the pitting potential, the value of 0.5 V or more is judged to be "Passed" and the value less than 0.5 V is judged to be "Failed". Results of the pitting corrosion test are also shown in Table 3.

TABLE 3

Measurement results of mechanical properties and corrosion resistance of each HEA article.

| | Mechanical properties | | | | Corrosion resistance | |
| --- | --- | --- | --- | --- | --- | --- |
| | Tensile | | Breaking | | | |
| HEA article | strenth (MPa) | Pass/ Fail | elongation (%) | Pass/ Fail | Pitting potential (V vs. Ag/AgCl) | Pass/ Fail |
| M1C | 780 | Failed | 3.3 | Failed | 0.51 | Passed |
| M1E | 1065 | Passed | 5.3 | Failed | 0.50 | Passed |
| M1E-SW | 1139 | Passed | 35 | Passed | 0.86 | Passed |
| M1E-SA | 1323 | Passed | 17 | Passed | 0.84 | Passed |
| M1E-SW-A | 130 | Failed | 2.6 | Failed | 0.55 | Passed |
| M2C | 813 | Failed | 2.1 | Failed | 0.52 | Passed |
| M2E | 1080 | Passed | 4.1 | Failed | 0.52 | Passed |
| M2E-SW | 1155 | Passed | 27 | Passed | 0.89 | Passed |
| M2E-SA | 1342 | Passed | 13 | Passed | 0.87 | Passed |
| M3C | 795 | Failed | 1.7 | Failed | 0.50 | Passed |
| M3E | 1052 | Passed | 3.2 | Failed | 0.51 | Passed |
| M3E-SW | 1125 | Passed | 21 | Passed | 0.88 | Passed |
| M3E-SA | 1307 | Passed | 10 | Passed | 0.86 | Passed |
| M4C | 623 | Failed | 0.5 | Failed | 0.51 | Passed |
| M4E | 780 | Failed | 1.1 | Failed | 0.50 | Passed |
| M4E-SW | 834 | Failed | 7.3 | Failed | 0.84 | Passed |
| M4E-SA | 969 | Failed | 3.5 | Failed | 0.82 | Passed |
| M5E-SW | 1250 | Passed | 35 | Passed | 0.91 | Passed |
| M5E-SA | 1280 | Passed | 32 | Passed | 0.89 | Passed |
| M6E-SW | 1050 | Passed | 47 | Passed | 0.95 | Passed |
| M6E-SA | 1080 | Passed | 46 | Passed | 0.92 | Passed |

As shown in Table 3, the general cast HEA articles M1C to M3C that are the specimens produced without the additive manufacturing step have the tensile strength of less than 1050 MPa and the breaking elongation of less than 10%; thus the mechanical characteristics are judged as failed. The additive manufactured HEA articles M1E to M3E that are specimens produced with the additive manufacturing step but without the pseudo-solutionizing heat treatment step have the tensile strength of 1050 MPa or more and the breaking elongation of less than 10%; thus the mechanical characteristics are judged as failed in terms of ductility.

As for the HEA article produced using HEA powder P4 whose alloy composition is beyond specifications of the present invention, the mechanical characteristics are judged as failed regardless of manufacturing methods. These results verify that addition of more than 8 atomic % of Mo is not preferable.

As for the HEA article M1E-SW-A (average diameter of the ultrafine particles is more than 40 nm) produced through the aging heat treatment after the pseudo-solutionizing heat treatment step such that the dispersedly precipitated particles are coarsened, the mechanical characteristics thereof significantly deteriorate. These results verify that the average diameter of the dispersedly precipitated particles in the matrix phase crystals is preferably 40 nm or less.

In contrast, the pseudo-solutionized additive manufactured HEA articles M1E-SW, M1E-SA to M3E-SW, M3E-

SA, M5E-SW, M5E-SA to M6E-SW, and M6E-SA, which are the examples of the invention, have the tensile strength of 1050 MPa or more and the breaking elongation of 10% more; thus it is verified that those HEA articles have excellent mechanical characteristics.

In more detail, it is confirmed that the pseudo-solutionized additive manufactured HEA articles M6E-SW and M6E-SA produced using HEA powder P6 that contains a relatively small amount of Ni component and Ti component have a breaking elongation of 40% or more; i.e., particularly excellent in ductility. Furthermore, it is also confirmed that the pseudo-solutionized additive manufactured HEA articles M1E-SW, M1E-SA to M3E-SW, M3E-SA, M5E-SW, and M5E-SA produced using HEA powders P1 to P3 and P5 that contain more Ni component and Ti component than the HEA powder P6 have a tensile strength of 1100 MPa or more; i.e., particularly excellent in the mechanical strength.

On the other hand, regarding the corrosion resistance, all of the HEA articles show pitting potential of 0.5 V vs. Ag/AgCl or more, which verifies that all of the HEA articles have excellent corrosion resistance independent of manufacturing methods or microstructure. In other words, the HEA articles according to the invention are deemed to have excellent corrosion resistance because of the combination of the elements (Co—Cr—Fe—Ni—Ti—Mo). The pseudo-solutionized additive manufactured HEA articles according to the invention have higher pitting potential than other HEA articles. Therefore, the HEA articles of the invention are expected to have higher corrosion resistance.

[Experimental 6]

(Production and Inspection of Product Using HEA Article)

By means of the manufacturing method used to produce the pseudo-solutionized additive manufactured HEA article M1E-SW, an impeller shown in FIG. 7 was fabricated. For the obtained impeller, an internal defect inspection by X-ray CT scan was conducted and the size was measured. As a result, no particular internal defect that could affect mechanical characteristics was found, and deformation beyond the design dimensions was not detected either. This experiment verified the effectiveness of the invention.

The above-described embodiments and Examples have been specifically given in order to help with understanding on the present invention, but the invention is not limited to the configuration equipped with all the components described above. For example, some of the configurations of a certain embodiment may be replaced with the configurations of the other embodiments, and the configurations of the other embodiments may be added to the configurations of the subject embodiment. Furthermore, some of the configurations of each embodiment and example may be omitted, replaced with other configurations, and added to other configurations, as far as no departing from a technical concept of the invention.

LEGEND

10 . . . molten metal;
20 . . . alloy powder;
100 . . . EBM powder-based additive manufacturing apparatus;
110 . . . electron beam control part;
120 . . . powder control part;
111 . . . tungsten filament;
112 . . . anode;
113 . . . electron beam;
114 . . . astigmatic correction apparatus;
115 . . . focus coil;
116 . . . deflection coil;
121 . . . stage;
122 . . . base plate;
123 . . . powder hopper;
124 . . . rake arm;
210 . . . powder bed;
220 . . . solidified layer;
230 . . . additive manufactured alloy article; and
231 . . . pseudo-solutionized additive manufactured alloy article.

The invention claimed is:

1. An alloy article, having a chemical composition comprising:
   20 atomic percent to 35 atomic percent of Co;
   19.2 atomic percent to 25 atomic percent of Cr;
   10 atomic percent to 25 atomic percent of Fe;
   15 atomic percent to 30 atomic percent of Ni;
   5 atomic percent to 15 atomic percent of Ti;
   1.9 atomic percent to 8 atomic percent of Mo; and
   remainder substances of unavoidable impurities,
   wherein ultrafine particles with an average diameter of 40 nm or less are dispersedly precipitated in matrix phase crystals of the alloy article.

2. The alloy article according to claim 1, wherein
   the ultrafine particles are crystalline particles in which the Ni component and the Ti component are more concentrated than in the matrix phase crystals.

3. An alloy article, having a chemical composition comprising:
   30 atomic percent to 33 atomic percent of Co,
   20 atomic percent to 23 atomic percent of Cr,
   20 atomic percent to 23 atomic percent of Fe,
   17 atomic percent or more and less than 23 atomic percent of Ni,
   5 atomic percent or more and less than 7 atomic percent of Ti,
   1 atomic percent to 3 atomic percent of Mo, and
   remainder substances of unavoidable impurities,
   wherein ultrafine particles with an average diameter of 40 nm or less are dispersedly precipitated in matrix phase crystals of the alloy article.

4. The alloy article according to claim 1, wherein
   tensile strength thereof is 1050 MPa or more and breaking elongation thereof is 10% or more.

5. The alloy article according to claim 1, wherein
   the matrix phase crystals are an equiaxial crystal in shape and have a simple cubic crystal structure.

6. A method for manufacturing the alloy article according to of claim 1, comprising the steps of:
   mixing and melting raw materials of the alloy to form molten metal;
   atomizing to form an alloy powder from the molten metal;
   additive manufacturing to form an additive manufactured article with a desired shape by means of an electron beam melting technique of a metal powder-based additive manufacturing method using the alloy powder; and
   pseudo-solutionizing heat treatment to pseudo-solutionize the additive manufactured article in a temperature range from 950° C. to 1180° C.

7. The method for manufacturing the alloy article according to claim 6, wherein
   the step of pseudo-solutionizing heat treatment is a process to water-cool or air-cool the additive manufactured article after holding the additive manufactured article within the temperature range.

8. A product using an alloy article,
said alloy article being the alloy article according to claim 1, and the product being an impeller of a fluid machine.

9. A centrifugal compressor incorporating the impeller according to claim 8.

10. The alloy article according to claim 2, wherein tensile strength thereof is 1050 MPa or more and breaking elongation thereof is 10% or more.

11. The alloy article according to claim 2, wherein the matrix phase crystals are an equiaxial crystal in shape and have a simple cubic crystal structure.

12. A product using an alloy article,
said alloy article being the alloy article according to claim 2, and the product being an impeller of a fluid machine.

13. A centrifugal compressor incorporating the impeller according to claim 12.

14. An alloy article having a chemical composition comprising:
28.9 atomic percent to 35 atomic percent of Co;
10 atomic percent to 25 atomic percent of Cr;
10 atomic percent to 25 atomic percent of Fe;
15 atomic percent to 30 atomic percent of Ni;
5 atomic percent to 15 atomic percent of Ti;
1.9 atomic percent to 8 atomic percent of Mo; and
remainder substances of unavoidable impurities, wherein ultrafine particles with an average diameter of 40 nm or less are dispersedly precipitated in matrix phase crystals of the alloy article.

15. The alloy article according to claim 2, wherein in the chemical composition, content of the Co is from 28.9 atomic percent to 35 atomic percent.

16. The alloy article according to claim 1, wherein in the chemical composition, content of the Ni is from 15 atomic percent to 26.3 atomic percent.

17. The alloy article according to claim 2, wherein in the chemical composition, content of the Ni is from 15 atomic percent to 26.3 atomic percent.

18. The alloy article according to claim 3, wherein the ultrafine particles are crystalline particles in which the Ni component and the Ti component are more concentrated than in the matrix phase crystals.

* * * * *